United States Patent
Ranalli et al.

(10) Patent No.: US 9,921,396 B2
(45) Date of Patent: Mar. 20, 2018

(54) OPTICAL IMAGING AND COMMUNICATIONS

(71) Applicant: ZIVA CORPORATION, San Diego, CA (US)

(72) Inventors: Eliseo Ranalli, Irvine, CA (US); Anis Husain, San Diego, CA (US); Aaron Birkbeck, Bonita, CA (US)

(73) Assignee: ZIVA CORP., San Diego, CA (US)

( * ) Notice: Subject to any disclaimer, the term of this patent is extended or adjusted under 35 U.S.C. 154(b) by 344 days.

(21) Appl. No.: 14/719,247

(22) Filed: May 21, 2015

(65) Prior Publication Data
US 2015/0268464 A1  Sep. 24, 2015

Related U.S. Application Data

(63) Continuation-in-part of application No. 13/543,411, filed on Jul. 6, 2012, now Pat. No. 9,071,742, and a
(Continued)

(51) Int. Cl.
*G02B 17/08* (2006.01)
*H04N 5/225* (2006.01)
(Continued)

(52) U.S. Cl.
CPC .......... *G02B 17/0896* (2013.01); *G02B 3/12* (2013.01); *G02B 13/06* (2013.01); *G02B 17/086* (2013.01);
(Continued)

(58) Field of Classification Search
CPC .................................. G02B 17/0896
See application file for complete search history.

(56) References Cited

U.S. PATENT DOCUMENTS

| 4,084,153 A | 4/1978 | Otten |
| 4,111,519 A | 9/1978 | Gillis et al. |

(Continued)

FOREIGN PATENT DOCUMENTS

WO   2008/076444 A1   6/2008

OTHER PUBLICATIONS

AOptix Technologies Introduces AO-Based FSO Communications Product, www.adaptiveoptics.org, Jun. 2005, as retrieved Jun. 13, 2014 (1 page) (All Pages).
(Continued)

*Primary Examiner* — James Pontius
(74) *Attorney, Agent, or Firm* — Anatoly S. Weiser, Esq.; IPLCounsel.com

(57) ABSTRACT

Selected embodiments include an imager providing wide field (WFOV) and foveated images. The imager includes a frontend optic receiving light. Corrective optics reduces distortions, and transmits the light to a splitter. One portion of the light exiting the splitter is focused on a WFOV image detector. A second portion falls on a scanning mirror targeting a selected field position. The light is corrected by an adaptive corrector, which may be configured for field position-dependent correction. The light from the corrector is focused on a foveated image detector. An eye tracker may be employed to select the foveated position corresponding to user gaze direction. Another imager includes a configurable corrector in the imager's optical stop. Free space optical (FSO) communication laser may be combined with a foveated/WFOV imager, with a corrector of the imager correcting the FSO light and a scanning component selecting transmission direction for the FSO light.

10 Claims, 9 Drawing Sheets

Related U.S. Application Data continuation-in-part of application No. 14/585,176, filed on Dec. 29, 2014, now abandoned, which is a continuation of application No. 13/731,067, filed on Dec. 30, 2012, now Pat. No. 9,002,138, which is a continuation-in-part of application No. 13/385,603, filed on Jun. 11, 2012, now abandoned.

(60) Provisional application No. 61/508,663, filed on Jul. 17, 2011, provisional application No. 61/524,738, filed on Aug. 17, 2011, provisional application No. 61/577,336, filed on Dec. 19, 2011.

(51) Int. Cl.

| | | |
|---|---|---|
| *G02B 3/12* | (2006.01) | |
| *G02B 13/06* | (2006.01) | |
| *G02B 26/12* | (2006.01) | |
| G02B 27/00 | (2006.01) | |
| G02B 27/14 | (2006.01) | |
| G02B 26/08 | (2006.01) | |
| G02B 3/14 | (2006.01) | |

(52) U.S. Cl.
CPC ......... *G02B 26/127* (2013.01); *H04N 5/2254* (2013.01); *H04N 5/2258* (2013.01); *H04N 5/2259* (2013.01); *G02B 3/14* (2013.01); *G02B 26/0825* (2013.01); *G02B 27/0093* (2013.01); *G02B 27/141* (2013.01)

(56) References Cited

U.S. PATENT DOCUMENTS

| | | | |
|---|---|---|---|
| 4,136,954 | A | 1/1979 | Jamieson |
| 4,386,848 | A * | 6/1983 | Clendenin ............... F41G 3/165 244/3.13 |
| 5,155,558 | A | 10/1992 | Tannenbaum et al. |
| 5,237,367 | A | 8/1993 | Kudo |
| 5,563,864 | A | 10/1996 | Kobayashi et al. |
| 5,818,429 | A * | 10/1998 | Tanaka ................... G06F 3/0433 345/173 |
| 5,930,012 | A | 7/1999 | Mears et al. |
| 6,369,954 | B1 | 4/2002 | Berge et al. |
| 6,421,185 | B1 | 7/2002 | Wick et al. |
| 6,470,097 | B1 | 10/2002 | Lai et al. |
| 6,839,181 | B1 * | 1/2005 | Cobb ..................... G02B 5/3058 348/E9.027 |
| 7,098,517 | B2 | 8/2006 | Matsuo |
| 7,298,916 | B2 | 11/2007 | Miyamoto |
| 7,345,267 | B2 * | 3/2008 | Jung ................... G02B 27/0037 250/201.9 |
| 7,535,501 | B1 | 5/2009 | Loushin et al. |
| 7,542,090 | B1 | 6/2009 | Merchant |
| 7,948,550 | B2 | 5/2011 | Robinson et al. |
| 8,203,702 | B1 * | 6/2012 | Kane ........................ G01J 3/02 356/139.05 |
| 8,752,969 | B1 * | 6/2014 | Kane .................... G02B 7/1821 356/139.05 |
| 9,002,138 | B2 | 4/2015 | Ranalli et al. |
| 2002/0054210 | A1 | 5/2002 | Glier et al. |
| 2002/0057506 | A1 | 5/2002 | Kaneko |
| 2002/0167603 | A1 | 11/2002 | Kato et al. |
| 2003/0124611 | A1 | 7/2003 | Schwartz |
| 2006/0049330 | A1 * | 3/2006 | Jung ................... G02B 27/0037 250/201.9 |
| 2007/0253057 | A1 | 11/2007 | Potsaid et al. |
| 2008/0100707 | A1 | 5/2008 | Brown |
| 2008/0278780 | A1 | 11/2008 | Stanley |
| 2009/0080695 | A1 | 3/2009 | Yang |
| 2009/0096914 | A1 * | 4/2009 | Domenicali .......... G01J 3/2803 348/345 |
| 2009/0251666 | A1 | 10/2009 | Lindacher et al. |
| 2009/0262363 | A1 | 10/2009 | Keshavmurthy et al. |
| 2010/0081901 | A1 | 4/2010 | Buice et al. |
| 2011/0043806 | A1 | 2/2011 | Guetta et al. |
| 2012/0292482 | A1 * | 11/2012 | Cook ..................... G01S 7/481 250/206.1 |
| 2015/0028194 | A1 * | 1/2015 | Cook ................... G02B 27/644 250/216 |

OTHER PUBLICATIONS

Beckers, Adaptive Optics for Astronomy: Principles, Performance, and Applications, Annu. Reo. Astron. Astrophys., 1993, 13-62, vol. 31, Iss. 1 (All Pages).

Brady et al., Multiscale Lens Design, Optics Express, 2009, 10659-10674, vol. 17, Iss. 13 (All Pages).

Cossairt et al., Diffusion Coding Photography for Extended Depth of Field, ACM Transactions on Graphics (TOG)—Proc. SIGGRAPH, 2010, Article No. 31, vol. 29, Iss. 4 (10 pages) (All Pages).

Dowski et al., Extended depth of field through wave-front coding, App. Opt., 1995, 1859-1866, vol. 34, No. 11 (All Pages).

Gonzalez et al., Image Restoration, in Gonzalez et al (eds.), Digital Image Processing 2nd Ed., 2002, 253-303, Ch. 5 (All Pages).

Graal on a Quest to Improve HAWK-I's Vision, ESO Picture of the Week as retrieved Jun. 13, 2014 (2 pages) (All Pages).

Harikumar et al., Exact Image Deconvolution from Multiple FIR Blurs, IEEE Trans. Image Process., 1999, 846-862, vol. 8 No. 6 (All Pages).

Hausler, A method to increase the depth of focus by two step image processing, Optical Communications, 1972, 38-42, vol. 6, No. 1 (All Pages).

Laikin, Lens Design, 3rd Ed. Revised and Expanded, 2001, 106-108, Ch. 9, Marcel Decker, Inc.

Max, Introduction to Adaptive Optics and its History, American Astronomical Society 197th Meeting (7 pages) (All Pages).

PixelOptics to Develop SuperVision for U.S. Military; $3.5 Million in Funding Provided ASDNews, ASDNews, as retrieved Jun. 13, 2014 (2 pages) (All Pages).

Retinal OCT Imaging System to Incorporate Adaptive Optics, www.adaptiveoptics.org, Apr. 10, 2006, as retrieved Jun. 13, 2014 (1 page) (All Pages).

Roorda et al., Retinal imaging using adaptive optics, in Macrae et al. (eds.), Customized Corneal Ablation: The Quest for SuperVision, 2001, 11-32, Ch. 2, Slack, Inc. (All Pages).

Stewart et al., Design and development of a 331-segment tip-tilt-piston mirror array for space-based adaptive optics, Sensors and Actuators A-Physical, 2007, 230-238, vol. 138 (All Pages).

Watson, Tip-Tilt Correction for Astronomical Telescopes using Adaptive Control, Wescon/97. Conference Proceedings, 1997, 490-497 (All Pages).

Yaroslavsky et al.,Deconvolution of multiple images of the same object, App. Opt., 1994, 2157-2162, vol. 33, Iss. 11 (All Pages).

Hyunki Lee et al.: "Active imaging system with variable viewing direction and position for 3D shape measurement in occluded region", 2009 International Symposium on Optomechatronic Technologies (ISOT 2009): Istanbul, Turkey, Sep. 21-23, 2009, IEEE, Piscataway, NJ, USA, Sep. 21, 2009 (Sep. 21, 2009), pp. 229-234, XP031563471, ISBN: 978-1-4244-4209-6.

* cited by examiner

OPTICAL IMAGING AND COMMUNICATIONS

CROSS-REFERENCE TO RELATED APPLICATIONS

The present application is a continuation-in-part of and claims priority from U.S. patent application Ser. No. 13/543,411, entitled OPTICAL IMAGING WITH FOVEATION, filed Jul. 6, 2012, now allowed; which application claims priority from (1) U.S. Provisional Patent Application Ser. No. 61/508,663, entitled APPARATUS, METHODS, AND ARTICLES OF MANUFACTURE FOR FOVEATED VISION (FOVIS), filed on 17 Jul. 2011; and (2) U.S. Provisional Patent Application Ser. No. 61/524,738, entitled Apparatus, Methods, and Articles of Manufacture for Foveated Vision (FOVIS), filed 17 Aug. 2011.

The present application is also a continuation-in-part of and claims priority from U.S. patent application Ser. No. 14/585,176, entitled COMPUTATIONAL IMAGING USING VARIABLE OPTICAL TRANSFER FUNCTION, filed Dec. 29, 2014; which application is a continuation of U.S. patent application Ser. No. 13/731,067, entitled COMPUTATIONAL IMAGING USING VARIABLE OPTICAL TRANSFER FUNCTION, filed Dec. 30, 2012, now U.S. Pat. No. 9,002,138; which application is a continuation-in-part of and claims priority from U.S. patent application Ser. No. 13/385,603, entitled COMPUTATIONAL IMAGING USING VARIABLE OPTICAL TRANSFER FUNCTION, filed Jun. 11, 2012; which application claims priority from U.S. Provisional Patent Application Ser. No. 61/577,336, entitled COMPUTATIONAL IMAGING USING A CONFIGURABLE OPTICAL COMPONENT, filed Dec. 19, 2011.

Each of the above-referenced patent documents is hereby incorporated by reference in its entirety as if fully set forth herein, including text, figures, claims, tables, and computer program listing appendices (if present), and all other matter in the patent documents.

FIELD OF THE INVENTION

This document is related to the fields of imaging and Free Space Optical (FSO) communications.

BACKGROUND

Fovea is a small area of the retina that affords acute central vision. The verb "foveate" means to direct an eye so that the fovea is directed at an object within the field of view. In this document, "foveation" and related inflectional morphemes of "fovea" generally refer to an imager's ability to provide zooming into an area of a scene, without losing the overall contextual information afforded by the larger view of the scene. Foveation is useful in many applications. For example, increasing demands on the warfighter for situational awareness may benefit from optical imaging techniques that enable gathering of information over large fields of view, and simultaneous rapid zooming into selected areas of the field of view.

Interest in foveated imaging has increased because of emerging military applications that include imaging for missiles, overhead surveillance based on unmanned aerial vehicles (UAVs), land-based surveillance for unattended sensors/motes and robotics, as well as laser pointing and designating. In addition, panoramic (e.g., 360°) threat detection systems, artificial vision systems, collision avoidance imaging systems, horizon tracking-capable system, border fence security systems, and submarine periscopes may benefit from inclusion or addition of foveation features.

Known foveated systems generally use gimbals (moving lens groups mechanically) and/or incorporate multiple cameras. Such systems may be expensive in terms of economic cost, power, weight, and size. They may also suffer from situational awareness issues. For example, they may not be able to provide the whole scene and the foveated image at the same time, or provide real-time multiple target tracking.

It is therefore desirable to provide wide field of view single- and multi-spectral imaging and vision methods and systems with foveation. It is desirable to provide such systems with lower costs, lower size, lower weight, and/or lower power consumption. It is also desirable to combine imaging systems with FSO communication systems.

SUMMARY

To address one or more of the needs described above and/or other needs, selected embodiments described in this document include catadioptric and other optical systems that incorporate a wide-angle lens and adaptive optical elements enabling wide field of view (WFOV) imaging with optical foveation and concurrent zoom capability having localized correction of aberrations. Selected embodiments include systems combining imaging with and FSO communication capabilities.

In embodiments, an imaging systems includes (1) a frontend optic configured to receive light from a scene in a wide field of view (WFOV), (2) a beam splitter configured to receive light exiting from the frontend optic and divide the light exiting from the frontend optic into a first beam and a second beam, (3) a wide field of view (WFOV) image detector configured to receive the first beam, (4) a scanning component controllable by one or more scan position signals, an adaptive wavefront corrector controllable by one or more wavefront correction signals, (5) an optical magnifier, and (5) a foveated image detector. The scanning component is configured to receive all or part of the second beam and reflect a portion of the second beam towards the adaptive wavefront corrector. The portion of the second beam incident on the adaptive wavefront corrector corresponds to a part (less than all) of the WFOV received by the frontend optic. The portion of the second beam reflected towards the adaptive wavefront corrector is determined by position of the scanning component, and the position of the scanning component is determined by the one or more scan position signals. The adaptive wavefront corrector is configured to correct the portion of the second beam reflected by the scanning component based on the one or more wavefront correction signals to obtain a corrected portion of the second beam, and to reflect the corrected portion of the second beam towards the foveated image detector. The optical magnifier is interposed in a light path between the scanning component and the foveated image detector. The imaging system operates so that WFOV images of the scene are formed on the WFOV image detector, and foveated images of selected portions of the scene are formed on the foveated image detector.

In embodiments, an imaging method includes the following steps: (1) receiving, through a frontend optic, light from a scene in a wide field of view (WFOV); (2) dividing light that exits the frontend optic into at least two beams, the at least two beams, including a first beam and a second beam; (3) projecting the first beam onto a wide field of view (WFOV) image detector; (4) selecting a portion of the second beam with a scanning component controllable by one or more scan position signals; (5) correcting the selected portion of the second beam by configuring an adaptive wavefront corrector controllable by one or more wavefront correction signals; (6) magnifying the selected portion of the second beam; and (7) projecting the selected, corrected, and amplified portion of the second beam onto a foveated image detector.

In embodiments, an imaging systems includes a first optical block, an adjustable corrective optical element, a second optical block, and an image detector. The first optical block is configured to receive light from a scene in a wide field of view (WFOV) and pass the light to the adjustable corrective optical element. The adjustable corrective optical element is configured to pass the light from the first optical block to the second optical block. The second optical block is configured to pass the light from the adjustable corrective element and project the light onto the image detector. The adjustable corrective optical element is configured to correct wavefront error of the light for a selectable field position, so that the image detector captures an image with a wide field of view and a corrected foveated portion of the image corresponding to the selectable field position.

In embodiments, an imaging system includes a processing system, a display, a foveated imager, and an eye tracking module. The foveated imager is configured by the processing system to display on the display a scene view, the scene view being a combined foveated and non-foveated view, the foveated view being a portion of the non-foveated view, the portion being selectable by the processing system. The eye tracking module is coupled to the processing system to provide gaze direction of a user of the imaging system in relation to the display. The processing system obtains the gaze direction and configures the foveated imager so that the foveated view corresponds to the gaze direction, so that the foveated view appears substantially on a portion of the display at the center of the view of the user.

In embodiments, an imaging system includes: (1) a foveated imager with an image sensor and an adjustable corrective element configurable in a plurality of different configurations; and (2) a processing system coupled to the foveated imager to enable the processing system to control configuration of the adjustable corrective element and to capture images of a scene by the foveated imager with different configurations of the adjustable corrective element, thereby obtaining a plurality of images of the scene, each image of the plurality of images of the scene being captured with a different configuration of the adjustable corrective element. The processing system is also configured to apply extended Wiener filtering to each image of the plurality of images of the scene, to obtain a corresponding filtered image of the scene, thereby obtaining a plurality of filtered images. The processing system is further configured to combine computationally the plurality of filtered images to obtain an enhanced image of the scene, which image may be displayed, stored, transmitted, or otherwise used.

In embodiments, an imaging system includes a first optical block configured to receive incoming light from a scene in a wide field of view (WFOV) and transmit the incoming light through the first optical block. The imaging system also includes a controllable deflecting component configured to receive the incoming light transmitted through the first optical block and redirect at least a portion of the incoming light transmitted through the first optical block in a direction controlled by one or more input signals to the controllable deflecting component. The imaging. The imaging system additionally includes a dichroic splitter. The imaging system further includes an image sensor. The imaging system further includes a corrective component placed to receive the incoming light redirected by the controllable deflecting component, the corrective component being configurable to perform wavefront error correction (WFE) on at least some field position of the scene, thereby resulting in corrected incoming light, and send the corrected incoming light towards the dichroic splitter, wherein the dichroic splitter transmits the corrected incoming light to the image sensor. The imaging system further includes a free space optical (FSO) light source operating at a Tx wavelength that is reflected by the dichroic splitter, the FSO light source being configured to emit FSO light toward the dichroic splitter, wherein: the dichroic splitter, the corrective component, and the controllable deflecting component are placed so that the FSO light reflected from the dichroic splitter (1) travels to the corrective component, (2) is WFE corrected by the corrective component and reflected by the corrective component toward the controllable deflecting component, and (3) is reflected by the controllable deflecting component towards the first optical block to exit through the first optical block towards the scene in an exit direction, the exit direction being set by the processing system controlling the controllable deflecting component. In a first mode of operation, the processing system configures the corrective component to perform WFE correction of incoming light for at least one field position and for a first wavelength at which the dichroic splitter is transmissive. In a second mode of operation, the processing system configures the corrective component to perform WFE correction of the FSO light corresponding to the Tx wavelength and the field position of the exit direction.

These and other features and aspects of selected embodiments not inconsistent with the present invention(s) will be better understood with reference to the following description, drawings, and appended claims.

DETAILED DESCRIPTION

Figure 1:
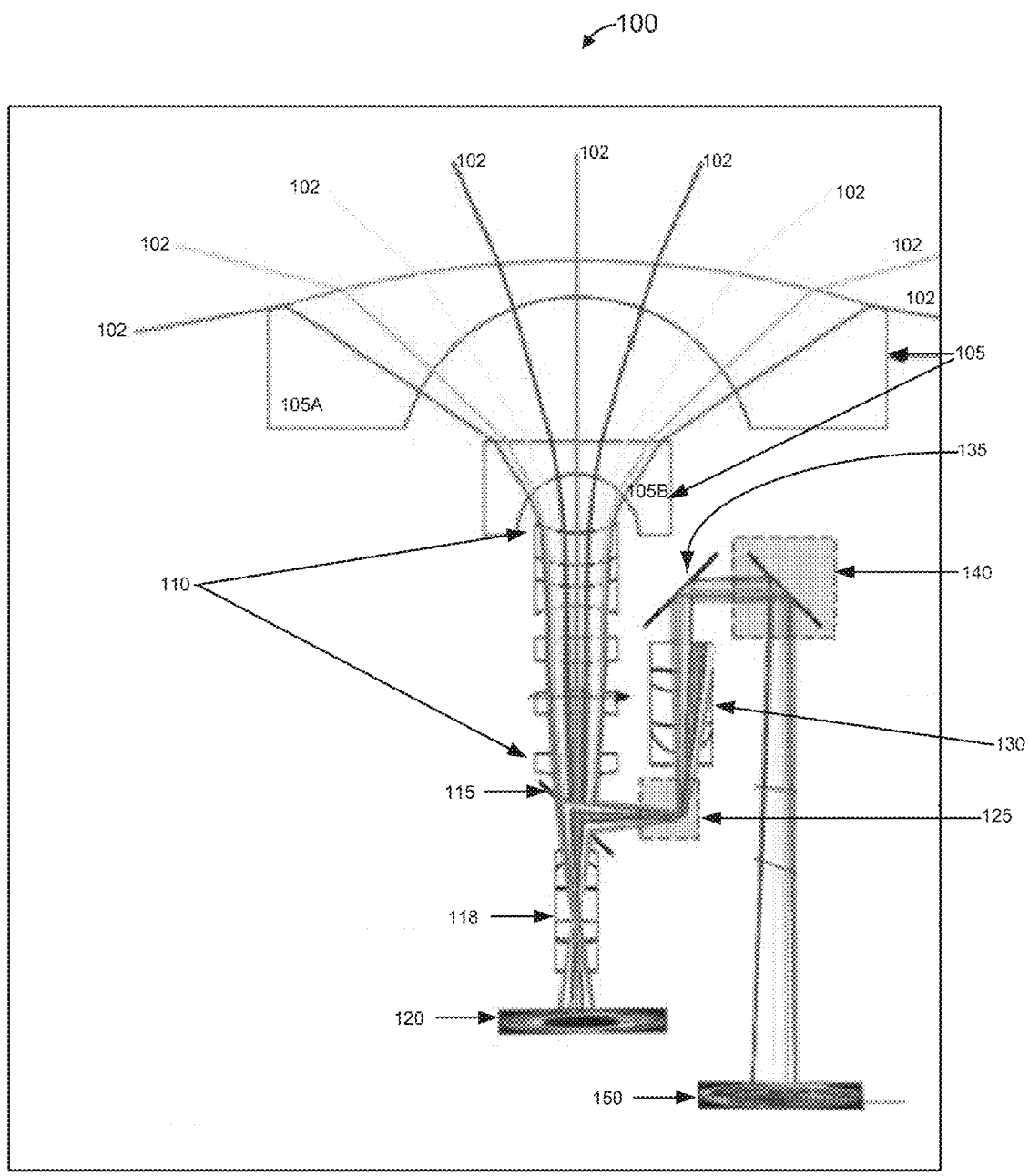
FIG. 1 shows selected components of an optical imaging system configured in accordance with selected aspects described in this document.

In this document, the words "embodiment," "variant," "example," and similar words and expressions refer to a particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place or context may refer to a different apparatus, process, or article of manufacture. The expression "alternative embodiment" and similar words and expressions are used to indicate one of a number of different possible embodiments, variants, or examples. The number of possible embodiments, variants, or examples is not necessarily limited to two or any other quantity. Characterization of an item as "exemplary" means that the item is used as an example. Such characterization does not necessarily mean that the embodiment, variant, or example is preferred; the embodiment, variant, or example may but need not be a currently preferred embodiment, variant, or example. All embodiments, variants, and examples are described for illustration purposes and are not necessarily strictly limiting.

The words "couple," "connect," and similar expressions with their inflectional morphemes do not necessarily import an immediate or direct connection, but include within their meaning both direct/immediate connections and connections through mediate elements.

The expression "processing logic" should be understood as selected steps and decision blocks and/or hardware for implementing the selected steps and decision blocks. "Decision block" means a step in which a decision is made based on some condition, and process flow may be altered based on whether the condition is met or not met.

A "field position" is the specific direction of incidence of the rays received by optics (e.g., a frontend optic) from a scene. Generally, a field position may vary in two dimensions. Thus, a scan of a scene involves image captures over field positions that may together cover the scene. The concept of field position is well understood in the imaging art.

"Optical" means related to visible and/or infrared portion(s) of the electromagnetic spectrum.

The adjective "wide," as it relates to the field of view, is intended in a sense relative to foveated view. A wide field of view is wider than a foveated view. In other words, the solid angle of the wide field of view is greater than the solid angle of the foveated view. A wide field of view may be, but not necessarily is, a panoramic field of view, such as a 360° by 20° field of view. A panoramic view may also be less than a 360° horizontal view, for example, greater than 45° or greater than 180°. It should be noted, however, that the embodiments described below may also operate with a wide field of view of less than 45°. A foveated view is a view of a portion of the wide field of view. In the examples below, the solid angle of the foveated view may be no greater than ½, ¼, 0.1, or 0.01 of the solid angle of the wide field of view. The to foveated view may be narrower than the wide field of view in one or both dimensions. For a 360° by 20° wide field of view, a foveated view may be, for example, a 3° by 2° field of view, or a 3° by 20° field of view.

When "top," "bottom," "left," "right" and analogous directional indicators are used for describing the embodiments in the Figures, they are intended to facilitate the description and not as substantive requirements. Thus, the "top" of the Boule lens in some of the Figures indicates the top when the Figures are held in an upright position, and are used to direct the reader to the specific portions of the Figures.

Other and further explicit and implicit definitions and clarifications of definitions may be found throughout this document.

Reference will be made in detail to one or more embodiments (apparatus, methods, and/or articles of manufacture) that are illustrated in the accompanying drawings. Same reference numerals may be used in the drawings and this description to refer to the same apparatus elements and method steps. The drawings may be in a simplified form, not to scale, and may omit apparatus elements and method steps that can be added to the described systems and methods, while possibly including optional elements and/or steps.

FIG. 1 shows selected components of an optical system 100 configured in accordance with selected aspects described in this document. The optical system 100 includes a frontend optic 105 that receives light rays 102 from a scene in the field of view and directs the light rays 102 through a corrective optics block 110 to a beam splitter 115. The beam splitter 115 divides and directs the light into two different paths.

In the first path, the light goes through a wide field of view (WFOV) optical block 118 that focuses the light onto a focal plane in which WFOV image detector 120 lies. The wide field of view image can thus be captured by the WFOV image detector 120, and then, for example, read, stored, processed, transmitted, and or displayed.

In the second path, the light is incident on a tip-tilt mirror 125. The angle of the tip-tilt mirror 125 is controllable, for example, by one or more electrical signals, through a servomechanism based on piezoelectric, voice-coil, mesohydraulic, and other technologies; the angle may be controlled in two dimensions, to allow two-dimensional scanning of the field of view. A portion of the reflected light (which portion depends on the position of the tip-tilt mirror 125) is reflected into an optical magnifier 130, that magnifies the light. The magnified light then falls on a folding mirror 135, which redirects the light towards an adaptive wavefront corrector 140. From the adaptive wavefront corrector 140, the light is reflected onto a foveated image detector 150. The image formed on the foveated image detector 150 (the "foveated image") can thus be captured by the foveated image detector 150, and then, for example, read, stored, processed, transmitted, and or displayed.

Figure 2A:
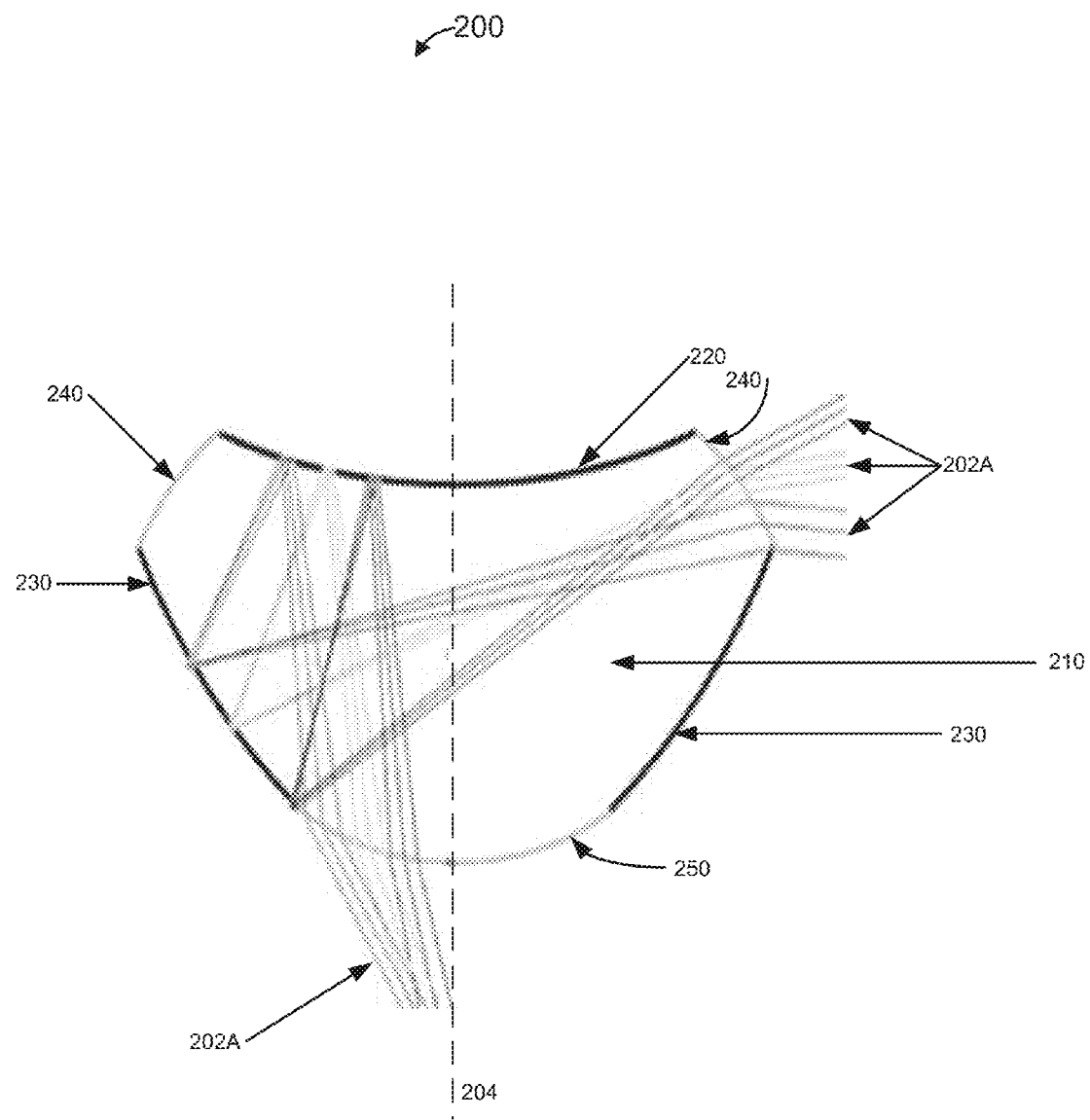
FIGS. 2A and 2B illustrate selected aspects of a catadioptric "Boule" lens.
Figure 2B:
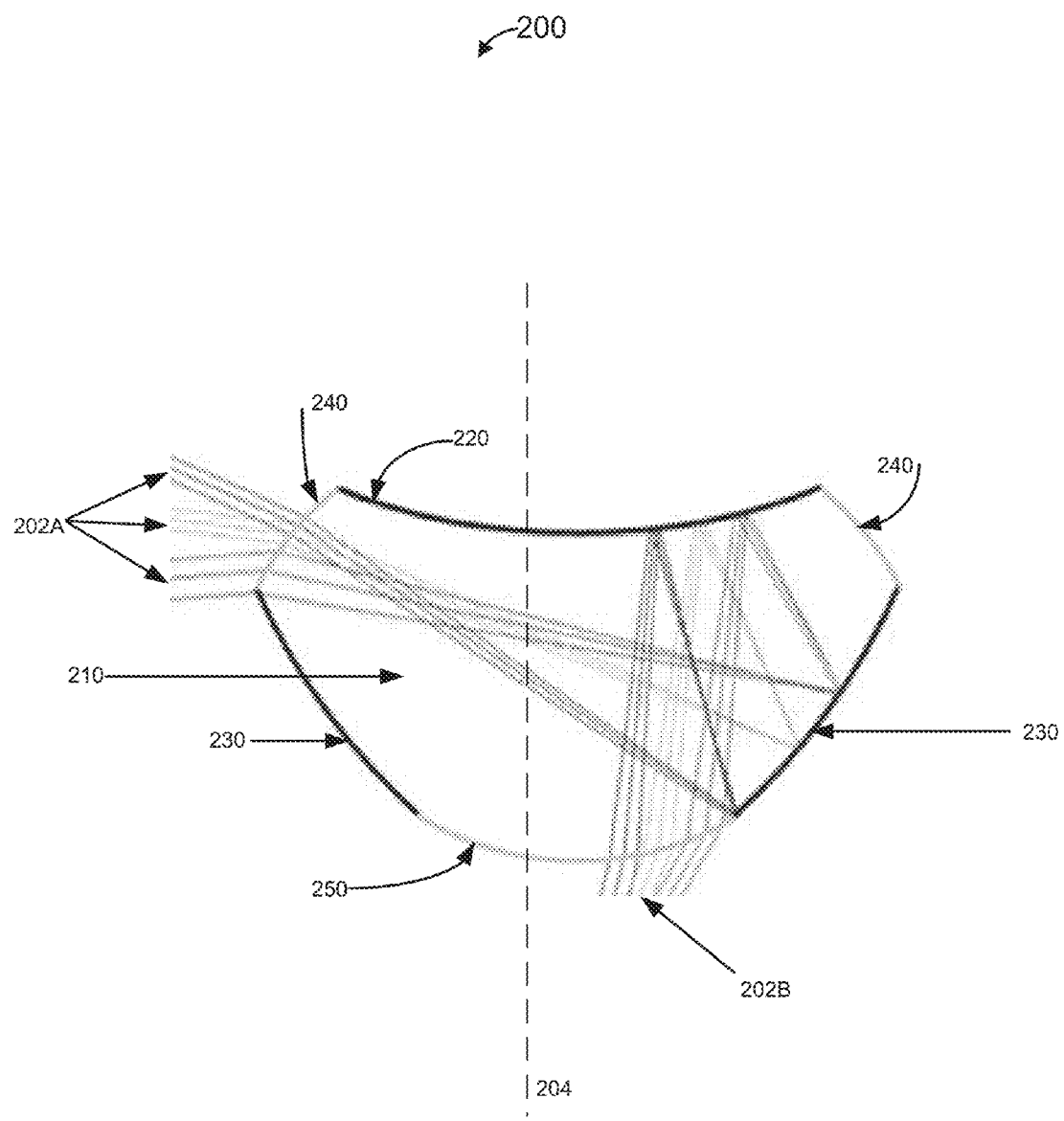

The frontend optic 105 may be a wide field of view lens, for example, a fisheye lens, as shown in FIG. 1. In embodiment, the frontend optic 105 is implemented as a novel catadioptric "Boule" lens. FIGS. 2A and 2B illustrate a cross-section of a Boule lens 200. A body 210 of the Boule lens 200 is made of a material with a high (>1) index of refraction, and has a shape defined by rotation of the cross-section around a center axis 204. A concave surface 220 is reflective (as viewed from the inside of the lens 200); for example, it is covered with a reflective material. Similarly, circular side surface 230 also is reflective (as viewed from the inside of the lens 200). As shown in FIGS. 2A and 2B, light rays 202A may enter the Boule lens 200 through a lens surface 240 (which is circular), are reflected from the side surface 230 onto the surface 220, reflect from the surface 220, and exit through a surface 250 at the bottom of the lens 200. The Boule lens may be fabricated by diamond machining a high index plastic material to achieve the correct surface curvatures, polishing the component pieces to a specified surface roughness within the design tolerances, depositing metals for the reflective layers and anti-reflective coating on both sides of the refractive elements, and aligning and bonding of the four components together to form the completed Boule lens. The Boule lens may be intrinsically color corrected for all visible and/or infrared wavelengths.

A parabolic mirror and other optical components may also be used for the frontend optic 105.

The light rays exiting the frontend optic 105 enter the corrective optics block 110, which may contain one or more elements. The corrective optics block 110 is interposed in the light path between the frontend optic 105 and the light splitting element 115, and may be configured to correct aberrations/distortions caused by the frontend optic 105. If the frontend optic 105 can provide diffraction limited resolution, the corrective optic 110 may not be necessary; indeed, it may be omitted in certain other variants as well.

From the corrective optic block 110, the light rays fall onto or enter the beam splitter 115, where the light is split into two parts that follow different light paths. (In embodiments, the light may be split into three or more parts with their corresponding paths, for example, to provide progressive foveation.) We can refer to the first path as a WFOV path, and to the second one as a foveated path. The beam splitter may be, for example, a semi-transparent mirror that transmits a part of the light incident upon it along the foveated path, and reflects the rest along the WFOV path, or vice versa. As shown in FIG. 1, the beam splitter transmits a portion of the incident light along the WFOV path, towards the WFOV optical block 118, and reflects a portion of the incident light towards the tip-tilt mirror 125. The ratio of the light between the two path may be for example, 1:1, 60:40, 10:1, 20:1, or 100:1, with uneven ratios favoring the foveated path to reduce the relative loss of contrast along the foveated path, or favoring the WFOV path to provide more light to the image covering a larger range of field positions.

In embodiments where it is present, the WFOV optical block 118 may perform various functions. Generally, it projects the wide field of view well onto the WFOV image detector 120, which can capture the WFOV images.

Turning now to the second or foveated path, the light reflected from the beam splitter 115 falls onto the tip-tilt (or scanning) mirror 125 and is reflected once again, towards the optical magnifier 130. The light received by the optical magnifier 130 corresponds to a part of the wide field of view; the particular part of the field of view depends on the angle (position) of the tip-tilt mirror 125. The angle can generally be controlled in two dimensions, to allow two-dimensional scanning of the field of view (but in variants, one-dimensional control may be used).

The optical magnifier 130 magnifies the portion of the field of view that it receives, for example, so that the portion is eventually projected to substantially all or a large part of the foveated image detector 150. From the optical magnifier 130, the light is projected onto the folding mirror 135, which redirects it towards the adaptive wavefront corrector 140.

Note that the various mirrors create what we can refer to as a "folded optical design" or "folded optics" for the foveated path, meaning that at least two reflective components (mirrors) change the physical path of the light within the optical system, to obtain a longer focal length than would otherwise be possible in the same physical size. In selected folded optical designs, the BFL (back focal length) is longer than each physical dimension of the design; in selected optical designs, the reflective elements change the light path by a combined angle of over 90 degrees, over 135 degrees, and/or 180 degrees or more. The folded optical design may be a feature of various embodiments, but is not necessarily required in all embodiments.

The wavefront corrector 140 is configured to compensate for aberrations in the light wavefront due to focusing errors from extreme (large incident angle) rays that limit optimal image resolution; it may also correct for other aberrations resulting, for example, from the frontend optic 105 and other optical components of the system 100. The wavefront corrector 140 may be, for example, a single- or multi-parameter controllable deformable mirror. Commercially available examples of MEMS-based (microelectromechanical system-based) general purpose deformable mirrors may be available from Thorlabs, 435 Route 206, North Newton, N.J. 07860; tel. 973-579-7227; www.thorlabs.com; www.thorlabs.com/NewGroupPage9.cfm?ObjectGroup_ID=3258.

Such mirrors are generally intended to take out aberrations such as defocus, astigmatism, spherical aberration and coma, often requiring many control parameters. The wavefront corrector 140 may also be a spatial light modulator such as a liquid crystal spatial light modulator, a liquid lens, or another kind of adaptive optics. The wavefront corrector 140 is configured using one or more inputs, for local compensation, i.e., compensation specific to the field position of the foveated view selected by the tip-tilt mirror 125. For example, to achieve an aberration-compensated 10× foveated zoom operation, a correction surface may be tailored to both the distribution and magnitude of the phasefront error and may be specific to the location of the target in the field of view. The settings of the adaptive wavefront corrector 140 may be determined in advance for each position of the tip-tilt mirror 125 (by characterizing the frontend optic, for example), so that the image is appropriately corrected for each individual position of the tip-tilt mirror 125. The settings may then be stored in a look-up table, to be retrieved based on the position of the tip-tilt mirror.

Figure 3:
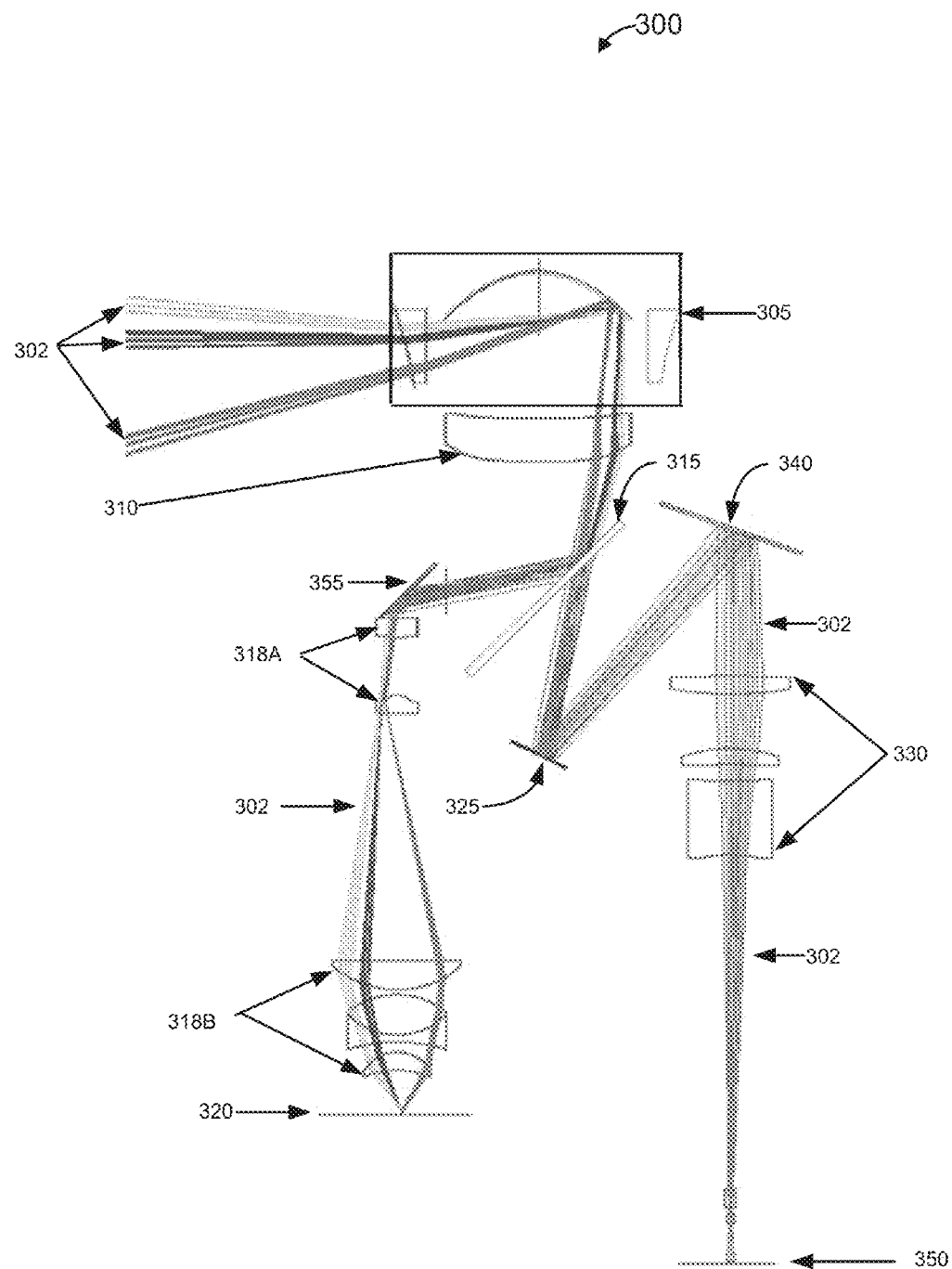
FIG. 3 shows selected components of another optical imaging system configured in accordance with selected aspects described in this document.

FIG. 3 shows selected components of another optical system 300 configured in accordance with selected aspects described in this document. The system 300 is similar to the system 100 discussed above, and its components are designated (for the most part) with reference numerals beginning with the digit "3" and ending with the same two digits as their respective counterparts in the system 100. Here, however, the WFOV path includes a folding mirror, and no such mirror may appear in the foveated path. Additionally, the optical magnifier is interposed between an adaptive wavefront corrector and a foveated image detector. Note also that the light in the foveated path is transmitted through the beam splitter 315 (which may be a partially reflective mirror), and the light in the WFOV path is reflected from the beam splitter 315; the arrangement in the system 100 was reversed in this regard.

Briefly, the optical system 300 includes a frontend optic 305 that receives light rays 302 from a scene in the field of view, and directs the light rays 302 through a corrective optics block 310 to a beam splitter 315. The beam splitter 315 divides and directs the light into two different light paths. In the first path, the light goes through WFOV optical blocks 318A and 318B, which focuses the light onto a focal plane of a WFOV image detector 320. The wide field of view image can thus be captured by the WFOV image detector 320, and then, for example, read, stored, processed, transmitted, and or displayed. In the second path, the light is incident on a tip-tilt (or scanning) mirror 325, which can be identical or similar to the tip-tilt mirror 125 of the system 100. The light reflected from the tip-tilt mirror 325 is reflected into an adaptive wavefront corrector 340. From the adaptive wavefront corrector 340, the light travels through an optical magnifier 330, where the light is magnified and focused on a foveated image detector 350. The foveated image formed on the foveated image detector 350 can be captured by the foveated image detector 350, and then, for example, read, stored, processed, transmitted, and or displayed.

Figure 4:
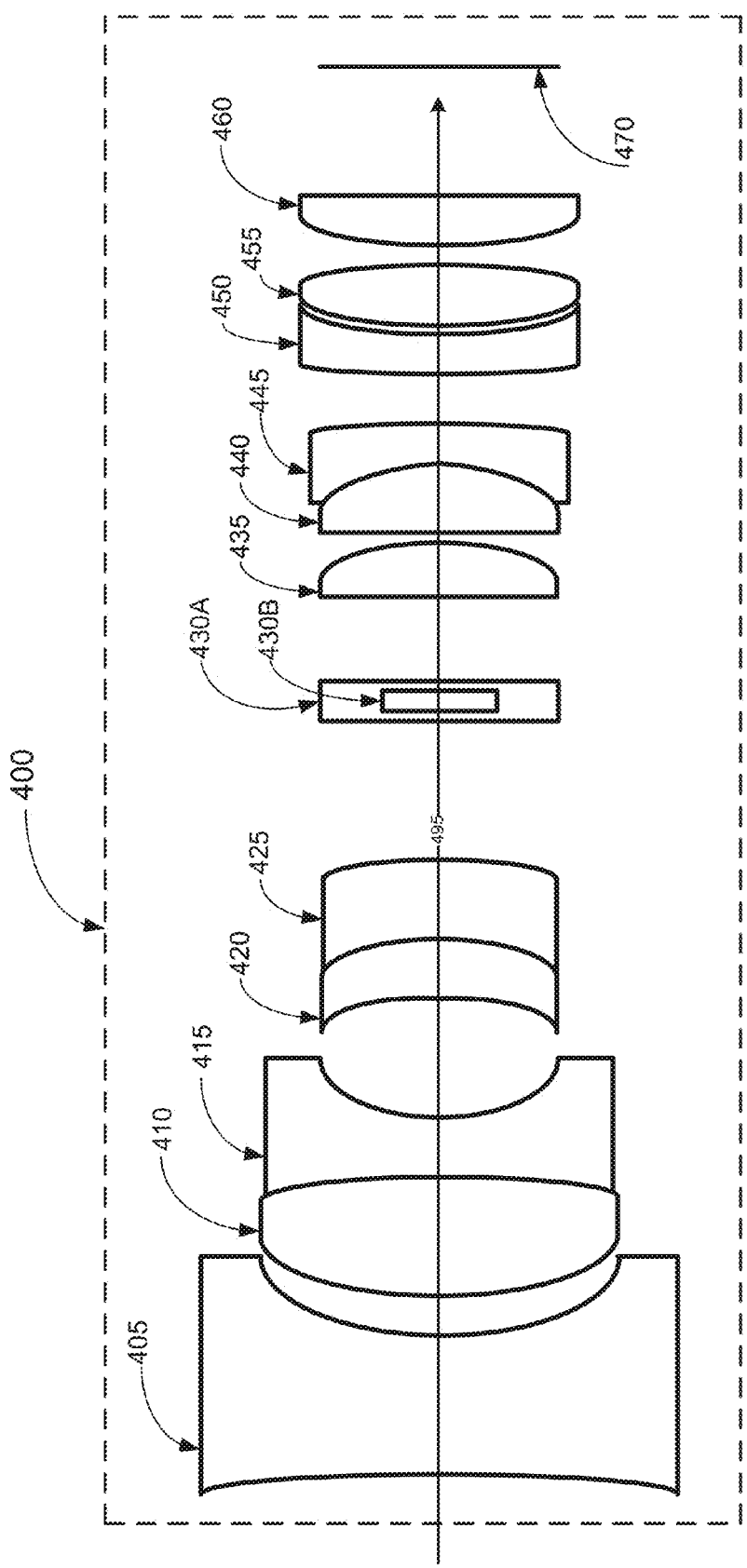
FIG. 4 shows selected components of still another optical imaging system configured in accordance with selected aspects described in this document.

FIG. 4 shows selected components of another optical system (imager) 400 configured in accordance with selected aspects described in this document. The optical system 400 includes an optical element (e.g., lens such as a strong negative lens) 405 that receives light rays 495 from a scene in the field of view (to the left of the element 405 as it appears in the Figure) and directs the light rays towards a first cemented/bonded doublet that includes optical elements (e.g., lenses) 410 and 415. The light rays 495 then go through a second cemented/bonded doublet that includes optical elements (e.g., lenses) 420 and 425.

From the second doublet, the light rays 495 travel through a combination of an optical stop 430A with an adjustable/controllable corrective element 430B; the corrective element may be, for example, a transmissive controllable spatial light modulator (SLM) or a controllable liquid lens, located at the optical stop of the system 400. In embodiments, the corrective element 430B may be located within the aperture (i.e., pupil) of the optical stop 430A.

From the combination of the optical stop 430A and the corrective element 430B, the light rays 495 travel through an optical element (e.g., lens) 435; a third doublet of optical elements (e.g., lenses) 440 and 445; an optical elements (e.g., lenses) 450, 455, and 460. The light rays 495 are then focused on an optical sensor 470, such as a high density focal plane array, which may be used, for example, to capture the image.

Note that the light rays 495 may come towards the frontend optics (405) from different field positions and at different angles. To the central axis of the imager 400.

In embodiments, the corrective element 430B is configured to correct the wavefront error (WFE) of some field position of the field of view and field positions adjacent to (in the vicinity of) the corrected field position, but less than all the field positions. The corrected field position may lie in the center of the foveated portion of the image captured by the sensor 470. The imager 400 can thus provide a combined foveated and non-foveated (wide field) image view.

Suitable corrective elements (430B) include transmissive SLMs such as LC2012 available from HOLOEYE Corporation, 1620 Fifth Avenue, Suite 550, San Diego, Calif. 92101, USA; and liquid lenses such as Holochip DP15 available from the same source.

For the corrective element 430B, liquid lenses generally provide a simpler option than SLMs. Varying the refractive power of such a lens over a small range allows foveated correction of any location of interest within the common focal plane array (FPA) that may be used as the sensor 470. Specifically, it locally corrects the field curvature associated with this lens design. For moderately large entrance apertures, however, there generally are more aberrations than can be addressed by a single degree of freedom available in a liquid lens.

The more complex liquid crystal SLM has the potential to compensate the field position-dependent wavefront error more comprehensively, because of a higher number of adjustable/controllable parameters. Its polarization dependence, however, may necessitate that a polarizer be added in the imager, resulting in half the light of the (presumably unpolarized) object being wasted. In applications where efficiency can be traded for compactness, a liquid crystal SLM may outperform liquid lens for the same image resolution.

Figure 5:
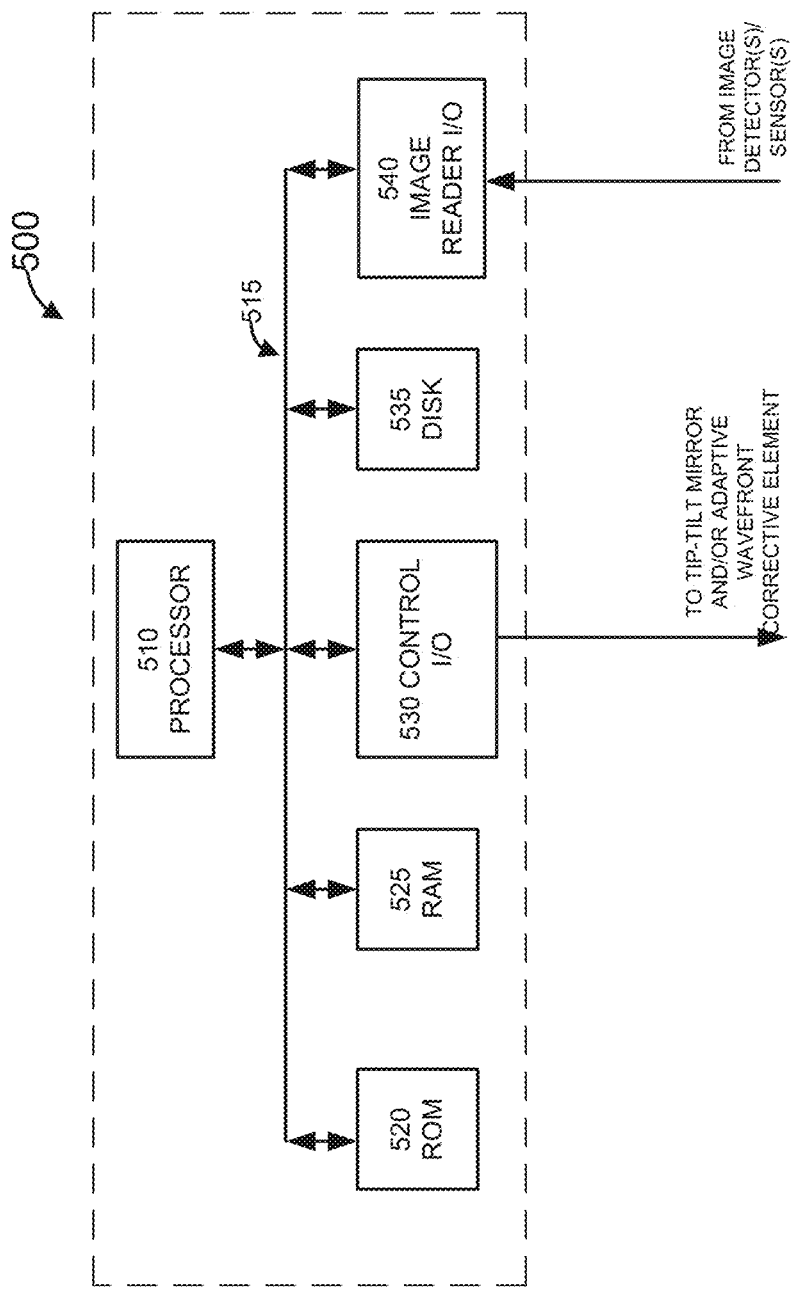
FIG. 5 shows selected components of a processor (computing) system that can be used to control the optical imaging systems configured in accordance with selected aspects described in this document.

FIG. 5 shows selected components of a processor or computer system 500 that may be coupled to optical systems such as the systems 100, 300, and 400 described above and the system 700 to be described below. The processor system 500 may be configured (1) to control the scanning by the tip-tilt mirrors (e.g., the tip-tilt mirrors 125 and 325), (2) to provide control inputs to the adaptive wavefront correctors (e.g., the wavefront correctors 140/340/430B), and (3) to read/process/store/transmit the images captured by the image detectors (e.g., the WFOV image detectors 120/320, the foveated image detectors 150/350, and the image sensor 470).

In FIG. 5, a processor 510 executes computer-readable program code instructions to control the operation of the processor system 500 and perform the method steps described throughout this document. The instructions may be stored in the processor 510 itself, in a read only memory (ROM) 520, in a random access memory (RAM) 525, and/or in disk storage 535. Generally, the program code instructions may be embodied in machine-readable storage media, such as hard drives, floppy diskettes, CD-ROMs, DVDs, flash memory and similar volatile or non-volatile devices that can store the instructions permanently or temporarily, in a non-transitory manner. The program code can also be transmitted over a transmission medium, for example, over electrical wiring or cabling, through optical fiber, wirelessly, or by any other form of physical transmission. The transmission can take place over a dedicated link between telecommunication devices, or through a wide- or local-area network, such as the Internet, an intranet, extranet, or any other kind of public or private network. In one embodiment, the program code is downloaded to the processor system 500 through a network interface of the processor system 500 (not shown).

The adaptive wavefront corrector look-up table may also be stored in one or more of the memory components of the processor system 500.

The processor system 500 may also include a control I/O circuit 530, which may be controlled by the processor 510 when the processor 510 executes the program code. The control I/O circuit 530 may be or may include analog and/or digital components, and may have one or more electrical outputs. The control I/O circuit 530 connects to corresponding control inputs of the scanning mirror and the adaptive wavefront corrector of the optical system, to set the states of the scanning mirror and the adaptive wavefront corrector. For example, the state of the output of the control I/O circuit 530 may determine the field position or direction of the scanning mirror of the optical system, and the state of the control signals/parameter of a deformable mirror. The processor system 500 may additionally include an image reader I/O 440, which may be a digital interface circuit configured to allow the processor 510 to read the images captured by the WFOV and foveated image detectors of the optical system.

A bus 515 may be used to connect together the different components of the computer system 500.

In embodiments, a foveated vision system is connected to a remote user through a network. The foveated vision system continuously or continually transmits to the remote user the WFOV image, and in response to a trigger event transmits the foveated view (either in addition or instead of the WFOV image). The trigger event may be a cue derived from automated analysis of the WFOV image, the remote user's request, or another event. In this way, the consumption of power and/or bandwidth resources may be reduced. Such remote vision systems may be used, for example, in video conferencing and remote security monitoring applications.

The transmission from the vision system to the remote user may be performed, in part or entirely, using Free Space Optical communications, as will be described below.

In embodiments, the WFOV images and the foveated images are captured at different wavelength. For example, the WFOV images may be captured in the visible spectrum, while the foveated images may be captured in the infrared spectrum, or vice versa.

Computational imaging may be used to recover sharper imagery from a sequence of partially-WFE-corrected images. For example, if the field-dependent optical transfer functions (OTFs) are known via calibration, this information can be used to recover a sharper image from a sequence of relatively-fuzzier images with known OTFs, by making use of the techniques described in the commonly-owned U.S. Pat. No. 9,002,138. Briefly, the imager 400 (or another imager) may be configured to capture a number of images with different OTFs of the imager. The different images may then be combined into an enhanced image using, for example, moving average processing schemes, recursive processing approaches, extended Wiener filtering. In this way, the liquid lens may yield diffraction-limited imagery despite the inability of a simple SLM to compensate WFE at all the field positions, provided enough fuzzy images with a-priori known OTFs are taken.

As has already been mentioned, the foveated and non-foveated views may be merged into a single view. If the viewer's instantaneous gaze direction is known, the foveated view may be placed in the center of the viewer's instantaneous field of view, and the non-foveated view in the other portions of the display (the periphery of the viewer's instantaneous field of view). Software for tracking viewer gaze direction may be combined with other software executing on the computer system connected to the foveated imager, such as the imagers 100, 300, and 400 described above and the system 700 to be described below. The software may run on a computer system such as the system 500, or another computer system. Eye tracking may be performed using an infrared tracker to monitor eye rotation.

Figure 6:
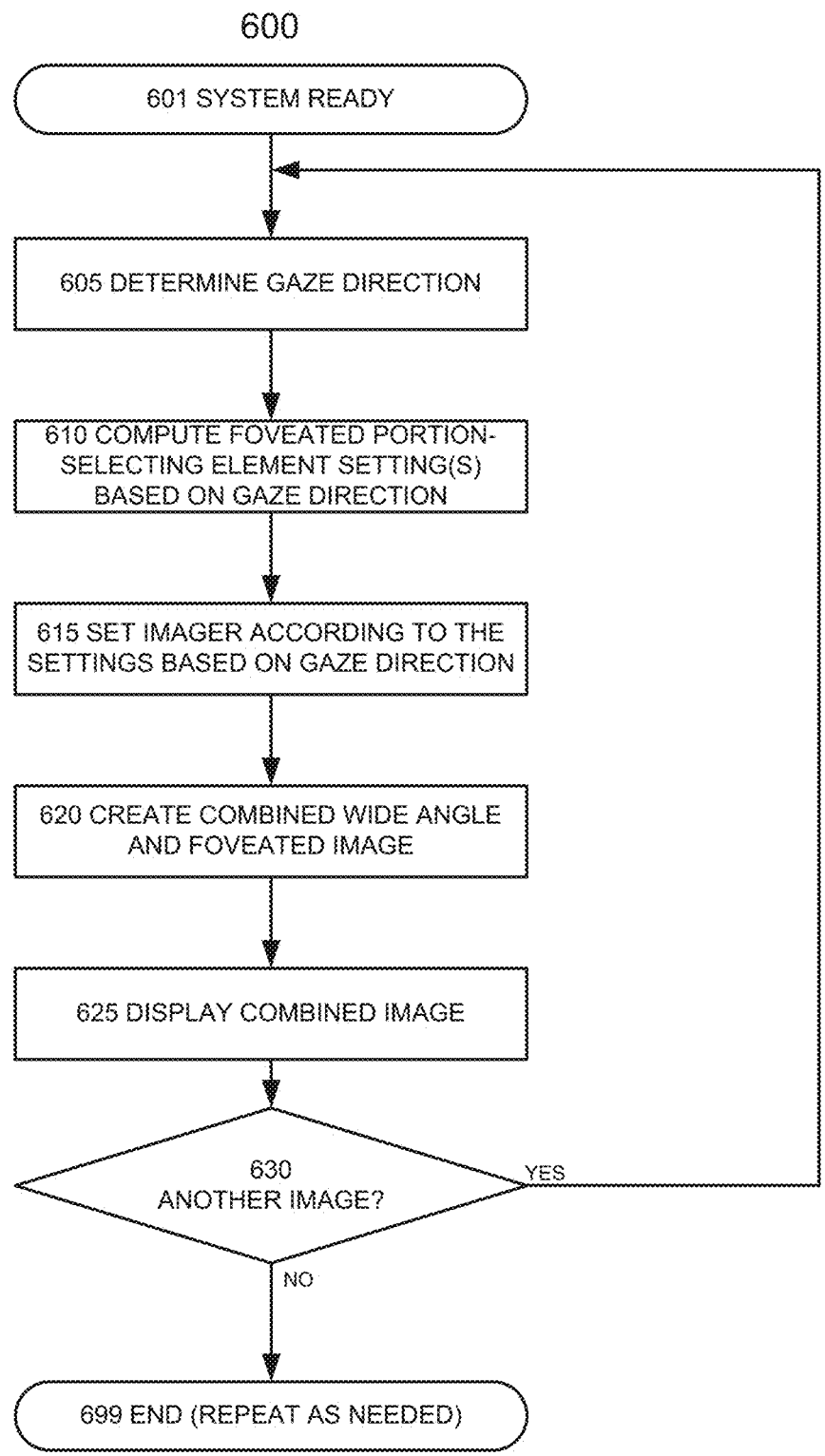
FIG. 6 illustrates selected steps of a method of gaze direction-dependent foveated imaging.

FIG. 6 illustrates selected steps of a method for implementing the gaze direction-dependent foveated imager. At flow point 601, an imager (such as the imager 100, 300, 400, 700 with gaze direction-tracking capability) is configured, powered up, and ready to perform the process.

In step 605, the direction of the gaze of the viewer of the image is determined.

In step 610, the imager computes the parameter(s) (setting(s)) of the element that selects the foveated portion so that some predetermined point of the foveated view (e.g., the center of the foveatred view) will correspond to the direction of the gaze. The element that selects the foveated portion may be, for example, the tip-tilt (or scanning) mirror 125 of the system 100; tip-tilt (or scanning) mirror 325 of the system 300; the adjustable/controllable corrective element 430B of the system 400; or the controllable deflecting component of the system 700 to be described below.

In step 615, the parameter(s) of the element that selects the foveated portion is (or are, as the case may be) set to the values determined in the previous step 610.

In step 620, the system captures and processes a current combined wide-angle and foveated image, with the foveated region selected in accordance with the direction of the gaze as described in the preceding steps.

In step 625, the current image or a portion of the image is displayed, with the foveated portion being displayed with higher quality than the remainder (periphery) of the image. Additionally, the image or portions thereof may be for example, stored in a memory and transmitted, locally or remotely. The transmission may be performed using FSO, as will be discussed below.

In decision block 630, it is determined whether another image should be captured and processed. If so, the process flow returns to the step 605, and proceeds as has been described above. Otherwise, the process flow may terminate in flow point 699, to be repeated as needed.

In embodiments of the eye tracker-enabled system, outputs of two imagers are projected stereoscopically onto a 3-dimensional, immersive display that includes augmented and/or virtual reality functionalities. The stereoscopic image may be rendered to enable depth perception.

Figure 7A:
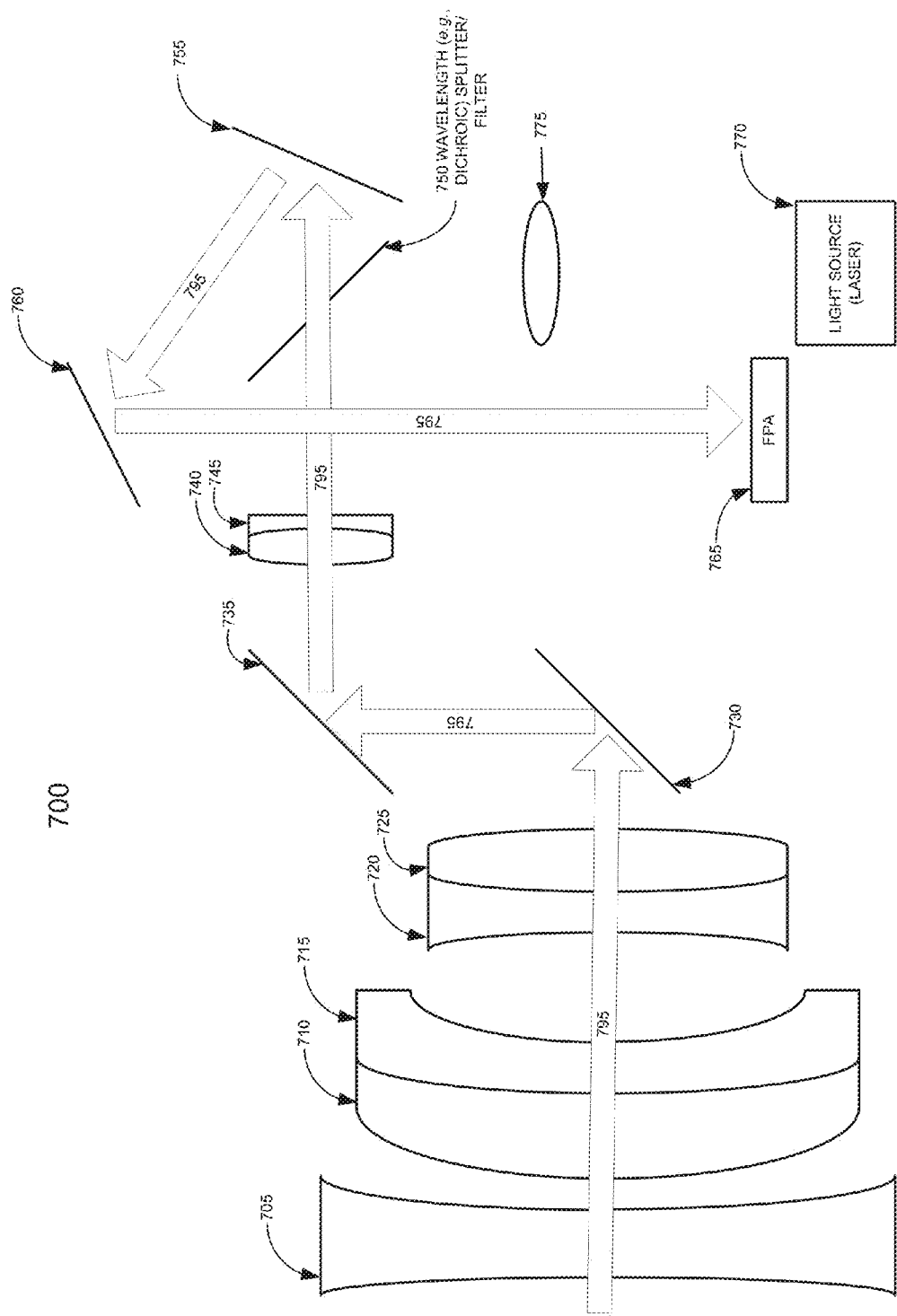
FIG. 7A and FIG. 7B show selected components of an optical/communication system configured in accordance with selected aspects described in this document.
Figure 7B:
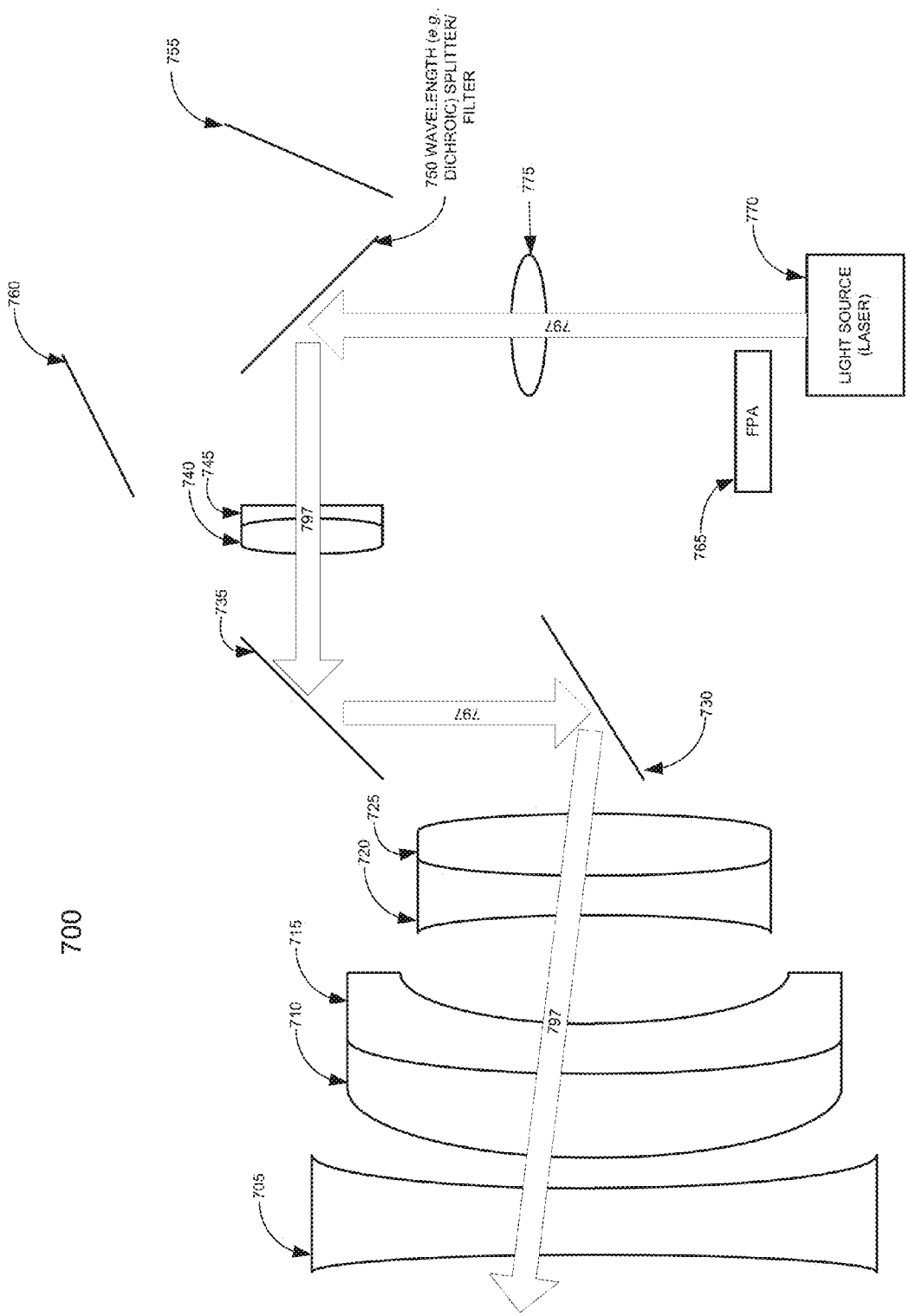

FIG. 7A and FIG. 7B show selected components of an optical/communication system 700 configured in accordance with selected aspects described in this document. FIG. 7A illustrates selected aspects of imaging of the system 700, while FIG. 7B illustrates selected aspects of free-space optical (FSO) communications of the system 700.

We first describe selected aspects shown in FIG. 7A, i.e., selected aspects of the system 700 in the imaging mode. Light rays 795 are incident from the left of the Figure, passing through a lens 705, a first doublet made of lenses 710 and 715, and a second doublet made of lenses 720 and 725. The light rays 795 (e.g., visible light or infrared rays) are then deflected towards a deformable mirror 735 by a controllable deflecting component 730, such as a fast scanning mirror or a tip-tilt mirror. The controllable deflecting component 730 may be identical, analogous, or similar to the mirror 125 of FIG. 1 and the mirror 325 of FIG. 3. In variants, the deformable mirror 735 may be replaced by a combination of a non-deformable folding mirror with a corrective element, such as an SLM or a liquid lens.

From the mirror 735, the light rays 795 travel through a third doublet made of lenses 740/745, and through a dichroic splitter 750. The dichroic splitter 750 may be identical, analogous or similar to the beam splitters 115/315 described above. The dichroic splitter 750 is such that it allows the light rays 795 to pass through, because of their wavelengths. The light rays 795 are then deflected by a folding mirror 755 towards another folding mirror 760, which deflects the light rays 795 towards an optical detector/sensor 765, such as an FPA. In imaging operation, the system 700 may be configured so that the deformable mirror 735 is an adaptive wavefront corrector controllable by one or more wavefront correction signals. For example, the system 700 may be operated to provide an image combining a wide-angle view with a selectable foveated view, substantially as has been described above in relation to the system 400.

We next describe selected aspects shown in FIG. 7B, i.e., the FSO communication mode. Here, a light source (such as a laser) 770 generates a light ray communication signal 797. The light ray 797 may be an infrared signal (e.g., at 1.55 μm wavelength), and may carry a data signal. The signal 797 travels through a lens 775 towards the dichroic splitter 750, which reflects the signal 797 (because of the signal's wavelength). The signal 797 then passes through the doublet 740/745, and is reflected by the deformable mirror 735 towards the scanning mirror 730. From the scanning mirror 730, the signal 797 travels through the frontend lenses 725, 720, 715, 710, and 705, and is emitted from the system 700. The scanning mirror 730 may be configured to so that the signal 797 is emitted in a desired direction, presumably towards an FSO receiver. The deformable mirror 735 may be configured (using its controllable parameter(s)) for wavefront error correction corresponding to the field position associated with (1) the direction in which the signal 797 is emitted, and (2) the wavelength of the signal 797.

The optical/communication system 700 may be controlled by a computer system, such as the system 500 described above. In particular, the computer system (e.g., 500) may control the scanning mirror 730, the deformable mirror 735, the optical detector/sensor 765, and process images in a manner analogous or identical to that described above in relation to the systems 100, 300, and 400. The computer system (e.g., 500) may also control the scanning mirror 730 to point the signal 797 in the desired direction; and it may configure the deformable mirror 735 for appropriate correction of the signal 797 based on the wavelength of the signal 797 and the field position corresponding to the direction of emission of the signal 797. Additionally, the computer system may control the operation of the light source 770 so that the signal 797 carries the desired data, such as the data obtained in the course of the system 700 operating as an imager.

The optical systems with foveation described in this document may be incorporated in panoramic threat detection systems, artificial vision systems, collision avoidance imaging systems, horizon tracking-capable system, border fence security systems, and submarine periscopes. They can also be used to enhance Intelligence, Surveillance, and Reconnaissance (ISR) capabilities for unmanned aerial vehicles (UAVs); unmanned ground vehicles (UGVs); unattended ground sensors (UGSs); soldier-portable platforms; and remote security camera systems. Furthermore, the optical systems can be integrated with control systems (human interface or artificial vision systems) for target recognition and tracking. They can operate at both visible and infrared wavelengths. Rapid foveated target selection may be made possible using an eye tracking interface that translates movements of the eye and head into target acquisition cues.

The system and process features described throughout this document may be present individually, or in any combination or permutation, except where presence or absence of specific feature(s)/element(s)/limitation(s) is inherently required, explicitly indicated, or otherwise made clear from the context.

Although the process steps and decisions (if decision blocks are present) may be described serially in this document, certain steps and/or decisions may be performed by separate elements in conjunction or in parallel, asynchronously or synchronously, in a pipelined manner, or otherwise. There is no particular requirement that the steps and decisions be performed in the same order in which this description lists them or the Figures show them, except where a specific order is inherently required, explicitly indicated, or is otherwise made clear from the context. Furthermore, not every illustrated step and decision block may be required in every embodiment in accordance with the concepts described in this document, while some steps and decision blocks that have not been specifically illustrated may be desirable or necessary in some embodiments in accordance with the concepts. It should be noted, however, that specific embodiments/variants/examples use the particular order(s) in which the steps and decisions (if applicable) are shown and/or described.

The instructions (machine executable code) corresponding to the method steps of the embodiments, variants, and examples disclosed in this document may be embodied directly in hardware, in software, in firmware, or in combinations thereof. A software module may be stored in volatile memory, flash memory, Read Only Memory (ROM), Electrically Programmable ROM (EPROM), Electrically Erasable Programmable ROM (EEPROM), hard disk, a CD-ROM, a DVD-ROM, or other form of non-transitory storage medium known in the art, whether volatile or non-volatile. Exemplary storage medium or media may be coupled to one or more processors so that the one or more processors can read information from, and write information to, the storage medium or media. In an alternative, the storage medium or media may be integral to one or more processors.

This document describes in detail the inventive apparatus, methods, and articles of manufacture for imaging and FSO communications. This was done for illustration purposes and, therefore, the foregoing description is not necessarily intended to limit the spirit and scope of the invention(s) described. Neither the specific embodiments of the invention(s) as a whole, nor those of its or their features necessarily limit the general principles underlying the invention(s). The specific features described herein may be used in some embodiments, but not in others, without departure from the spirit and scope of the invention(s) as set forth herein. Various physical arrangements of components and various step sequences also fall within the intended scope of the invention(s). Many additional modifications are intended in the foregoing disclosure, and it will be appreciated by those of ordinary skill in the pertinent art that in some instances some features will be employed in the absence of a corresponding use of other features. The embodiments described above are illustrative and not necessarily limiting, although they or their selected features may be limiting for some claims. The illustrative examples therefore do not necessarily define the metes and bounds of the invention(s) and the legal protection afforded the invention(s).

What is claimed is:

1. An imaging system comprising:
    a first optical block configured to receive incoming light from a scene in a wide field of view (WFOV) and transmit the incoming light through the first optical block;
    a controllable deflecting component configured to receive the incoming light transmitted through the first optical block and redirect at least a portion of the incoming light transmitted through the first optical block in a direction controlled by one or more input signals to the controllable deflecting component;
    a dichroic splitter;
    an image sensor;
    a corrective component placed to receive the incoming light redirected by the controllable deflecting component, the corrective component being configurable to perform wavefront error correction (WFE) on at least some field position of the scene, thereby resulting in corrected incoming light, and send the corrected incoming light towards the dichroic splitter;
    wherein the dichroic splitter transmits the corrected incoming light to the image sensor;
    a free space optical (FSO) light source operating at a Tx wavelength that is reflected by the dichroic splitter, the FSO light source being configured to emit FSO light toward the dichroic splitter;
    wherein:
    the dichroic splitter, the corrective component, and the controllable deflecting component are placed so that the FSO light reflected from the dichroic splitter (1) travels to the corrective component, (2) is WFE corrected by the corrective component and reflected by the corrective component toward the controllable deflecting component, and (3) is reflected by the controllable deflecting component towards the first optical block to exit through the first optical block towards the scene in an exit direction, the exit direction being set by the processing system controlling the controllable deflecting component;

in a first mode of operation, the processing system configures the corrective component to perform WFE correction of incoming light for at least one field position and for a first wavelength at which the dichroic splitter is transmissive; and in a second mode of operation, the processing system configures the corrective component to perform WFE correction of the FSO light corresponding to the Tx wavelength and the field position of the exit direction.

2. An imaging system as in claim 1, wherein the processing system is further configured to operate the imaging system in a first mode and in the second mode during non-overlapping time periods.

3. An imaging system as in claim 2, wherein the corrective element comprises a deformable mirror.

4. An imaging system as in claim 2, wherein the corrective element comprises a folding mirror and a liquid lens.

5. An imaging system as in claim 2, wherein the corrective element comprises a folding mirror and a spatial light modulator.

6. An imaging system as in claim 2, wherein the corrected incoming light is transmitted through the dichroic splitter via successive reflections from at least two folding mirror.

7. An imaging system as in claim 2, wherein the corrected incoming light is transmitted through the dichroic splitter by a folding mirror means for directing light.

8. An imaging system as in claim 2, wherein the first optical block comprises, a negative lens, a first doublet, and a second doublet.

9. An imaging system as in claim 2, further comprising a third doublet situated between the corrective element and the dichroic filter so that the corrected incoming light passes through the third doublet.

10. An imaging system as in claim 2, further comprising a focusing lens situated between the FSO light source and the dichroic splitter so that the FSO light emitted by the FSO light source towards the dichroic splitter passes through the focusing lens.

* * * * *